Feb. 9, 1971 P. B. HOOPER 3,561,873
RECORDING SPECTROPOLARIMETER WITH ZERO LEVEL COMPENSATOR
Filed March 2, 1964 4 Sheets-Sheet 2

PAIGE B. HOOPER
INVENTOR.

BY

*Pet b Lawlor*
ATTORNEY

PAIGE B. HOOPER
INVENTOR.

BY
ATTORNEY

United States Patent Office 3,561,873
Patented Feb. 9, 1971

3,561,873
RECORDING SPECTROPOLARIMETER WITH
ZERO-LEVEL COMPENSATOR
Paige B. Hooper, Glendora, Calif., assignor, by mesne assignments, to Cary Instruments, Monrovia, Calif., a corporation of California
Filed Mar. 2, 1964, Ser. No. 348,347
Int. Cl. G01j 3/00; G01n 21/44
U.S. Cl. 356—96                                   6 Claims

ABSTRACT OF THE DISCLOSURE

A spectropolarimeter having a control unit for substantially eliminating errors that would otherwise occur in the measurement from one wavelength to another and from one specimen to another. The control unit includes a zero-correction sub-unit, a deflection signal sub-unit and a balancing sub-unit. The zero-correction sub-unit makes such zero-correction possible throughout the entire spectrum. The balancing sub-unit makes it possible to shift the zero level to facilitate recording on an enlarged scale the significant data of a spectropolarogram. The balancing sub-unit also makes it possible to record different spectropolarograms and even different parts of the same polarogram to different scales.

This invention relates to spectrometers and more particularly to improvements in spectropolarimeters that are employed for measuring effects of materials such as liquids and solids on polarized light.

In a spectropolarimeter of the type to which this invention is particularly applicable, a specimen under investigation is located on a light path between a polarizer and analyzer. In addition, a Faraday cell that is subject to the influence of an oscillating magnetic field is located on the path between the polarizer and the analyzer. In the prior art it has been common practice to locate the polarizer, the specimen, the Faraday cell, and the analyzer in a single straight optical path. In an improved polarimeter described and claimed in copending patent application Ser. No. 772,992, filed on Nov. 10, 1958, by Henry H. Cary, now Patent No. 3,312,141, the polarizer and analyzer are mounted closely adjacent to each other and a mirror is incorporated in the Faraday cell to return radiation that has been transmitted through the polarizer to the analyzer. In either event monochromatic radiation is transmitted along that path through the polarizer, the specimen under investigation, the Faraday cell, and the analyzer to a photocell. In a spectropolarimeter the wavelength of the monochromatic radiation is varied during the course of the analysis.

The radiation that emerges from a polarizer or analyzer is polarized in a polarization plane that contains the optical path and the electric vector of the radiation. (Some authors treat the plane containing the electric vector as the plane of polarization. Other authors treat the plane that contains the magnetic vector as the plane of polarization.) The same kind of unit that is used as a polarizer can also be used as an analyzer. Accordingly, it will be understood that when reference is made to the properties of a polarizer per se independently from its use in a polarimeter, an analyzer is to be considered as having the same properties. However, the invention is not limited to a device in which the polarizer and analyzer have the same structure or are otherwise interchangeable.

Due to optical dissymmetry of molecules and crystals in a material under investigation, the polarization of light transmitted therethrough or reflected therefrom may be altered. Such alteration can occur in the material even though no magnetic or electric field or other field is applied thereto and special effects can occur when such fields are applied. All of such effects can be studied and evaluated with a polarimeter. Examples of such optical dissymmetry effects are described below.

As plane polarized light from the polarizer is transmitted through the test specimen the polarization of the light incident on the specimen can be affected in many ways depending upon the properties of the material. Some materials exhibit optical activity. This name is applied to a material that rotates the plane of polarization of radiation transmitted therethrough ("optical rotation" or "circular bifrefringence"), while introducing some ellipticity of polarization ("circular dichroism"). All materials have magneto optic properties. Such properties cause rotation of the plane of polarization and in proportion to the intensity of a magnetic field applied to the specimen along the path of the radiation transmitted therethrough. This is known as the Faraday effect. All materials likewise exhibit a Cotton-Mouton effect. In this effect a magnetic field component transverse to the path of the radiation induces plane birefringence in the material, that is the velocity of propagation of plane polarized light is different depending on whether the polarization plane is parallel to or perpendicular to the component of a magnetic field that is normal to the light path. Some materials exhibit plane birefringence even in the absence of a magnetic field. Such materials cause the plane of polarization of a beam of radiation entering the material to be emitted from the material as an elliptically polarized beam, the major axis of the polarization ellipse being rotated relative to the polarization plane of the incident beam. The degree of ellipticity can vary from 0 to 1 depending upon the length and the orientation of the plane of polarization of the optical path in the specimen. Materials likewise exhibit a Kerr effect. These materials exhibit birefringence when an electrostatic field is applied to the material in a direction perpendicular to the optical axis. A polarimeter can be used in all of these cases and others to measure the effects that the materials have on polarized light. Such information is useful in the investigation of the properties and compositions of the materials under investigation. For convenience in this application, except where otherwise noted, it will be assumed that the specimen under investigation exhibits optical activity, that is, that the specimen is of such a nature that a beam of plane polarized light incident thereon is transmitted therethrough with a rotation of the plane of polarization. In the case of elliptically polarized light, the major axis of the polarization ellipse of the light leaving the sample is the "plane of polarization." More particularly when birefringence is produced by an optical element or specimen, plane polarized light that is transmitted therethrough is converted to elliptically polarized light. An elliptically polarized beam may be resolved into a circularly polarized component and a plane-polarized component. In the device described particularly herein, the circularly polarized component of the beam is not detected but the plane polarized component is detected. By suitable modification the circularly polarized component can be converted into a plane-polarized component and vice versa. For this reason the invention is not limited to the measurement of effects of specimens in rotating a plane-polarized beam but may be utilized in determining other effects which specimens have on a beam of polarized light. It will be understood, however, that the invention is applicable not only to the measurement of optical activity but to the measurement of other effects that materials have on polarized light.

When a specimen under investigation exhibiting optical activity is placed in the path of the beam, the plane of polarization rotates about the optical path and the analyzer transmits to the photocell that component of the beam which lies in the plane of polarization of the analyzer. In practice where the specimen exhibits optical activity, the plane of polarization is rotated by an amount proportional to the distance traveled by the radiation in the sample. The amount of rotation or other effect that is produced also depends upon the wavelength of the radiation. The term "optical rotatory dispersion" is applied to the variation of optical rotation with wavelength. In one type of spectropolarimeter, the Faraday cell is employed to introduce rotation of the plane of polarization in the opposite direction in order to compensate for the rotation produced by the specimen. In another type of polarimeter, the polarizer or the analyzer is rotated to compensate for the rotation introduced by the specimen. This invention is applicable to these and other types of spectropolarimeters.

In the particular type of spectropolarimeter described herein the polarizer and the analyzer are oriented in such angular positions about that optical axis, that light that is polarized by the polarizer is incident on the analyzer with the plane of polarization of the incident light perpendicular to the polarization plane of the analyzer thus resulting in a null or extinction condition.

A Faraday cell includes a Faraday coil wound on a Faraday core. The core is composed of a material which rotates the plane of polarization through an angle that depends on the strength and direction of the component of the magnetic field along the path of the beam. In such a cell the angle of rotation of the plane of polarization is proportional to the strength of the magnetic field along the axis of the core and in particular, therefore, is proportional to the current flowing through the coil. In the particular spectropolarimeter described herein, a sinusoidal alternating current of fundamental frequency is applied to the coil to cause the plane of polarization of radiation transmitted therethrough to oscillate about the plane of polarization of radiation directed thereinto. With this arrangement, an alternating current of fundamental frequency is generated in the photocell. The null or extinction condition is ascertained by adjusting conditions to reduce the current component of fundamental frequency in the output of the photocell to minimum or zero value.

In prior patent application, Ser. No. 772,992, filed by Henry H. Cary on Nov. 10, 1958 now Pat. No. 3,312,141, there was disclosed and claimed an improved polarimeter in which an AC current was applied to a Faraday cell to modulate or oscillate the plane of polarization at the analyzer and in which a DC current was applied to the Faraday cell to vary, the average angle of rotation introduced by the Faraday cell. Such modulated rotation produces an alternating current in the photocell and this current is measured and is utilized to vary the DC current to produce the desired compensation. In other words, with such a system when a specimen is placed in the polarimeter, the AC current modulates the amount of radiation falling on the photodetector, and the DC current is varied in order to adjust that AC current to a minimum or zero value to indicate when the polarizer, the sample cell, the Faraday cell, and the analyzer are in their extinction position.

It is extremely important in modern technology to be able to measure the optical rotation of a specimen to a very small angle, in fact to an accuracy of 0.001° and even smaller. By measuring the optical rotatory power of a specimen to such small angles at various wavelengths over a wide range of wavelengths, information is obtained regarding the molecular structure of the specimen under investigation and also regarding the concentrations of various components in that specimen, if it is a mixture. Such information is valuable both for scientific purposes and for industrial purposes.

While the invention is applicable to a spectropolarimeter in which the compensation of optical rotation is produced by adjustment of a DC current, it is especially applicable to a spectropolarimeter of the type in which the optical rotation produced by the sample cell is compensated by rotation of either the polarizer or the analyzer. The rotation of the polarizer to produce the desired compensation is particularly desirable in spectropolarimetry, since the amount of optical rotation produced by applying a particular DC current to a Faraday coil varies with wavelength. On the other hand the plane of polarization of many polarizers and analyzers is completely independent of wavelength, at least throughout very wide ranges.

In certain applications of polarimeters it is desirable to maintain the resolving power uniform throughout the wavelength range over which the measurements are being made. In other applications the resolving power $d\lambda/\lambda$ is permitted to vary over the spectrum under investigation. The resolving power is the ratio of the width $d\lambda$ of the radiation being emitted from the monochromator divided by the wavelength $\lambda$ at the center of the band. In other words, the resolving power is $d\lambda/\lambda$. For this purpose $d\lambda$ is sometimes taken as the separation between the two wavelengths of the spectral band emitted by the monochromator at which the intensity per unit wavelength is 50% of the maximum intensity in the band. However, it may be measured in other ways as may be convenient.

In other applications it is deisrable to vary the light grasp of the spectrophotometer in order to establish the intensity of the radiation being emitted from the monochromator to desired levels at different wavelengths. For example, if a high temperature light source that emtis white radiation is used as the source of light for the monochromator, the intensity of the radiation in a given band width is higher at long wavelengths and lower at short wavelengths. Accordingly, it is desirable to employ a relatively large value of light grasp to establish a high light transmission efficiency at short wavelengths and a relatively low value of light grasp to establish a low light transmission efficiency at long wavelengths.

In a monochromator the resolving power may be varied in different ways. The simplest way to vary the resolving power is to adjust the width of one or more of the slits through which the radiation is transmitted. More broadly, it is the "light grasp" of the monochromator that is varied. The term light grasp is a technical term that refers to the size of the beam as defined by the aperture stops which limit the cross-section of the beam in one direction or another transversely of the beam at various points along the length of the beam. The light grasp of the beam is set at different values at different wavelengths in order to establish the resolving power or light transmission efficiency of the monochromator at those wavelengths. This is usually done by varying the width of the entrance slit or the exit slit or both.

In any event, when the light grasp is varied serious difficulties are encountered in a spectropolarimeter by virtue of the fact that the beam being transmitted through the spectropolarimeter changes in dimensions at various parts thereby bringing into use different parts of the optical elements including the lenses, the polarizer, the sample cell, the Faraday cell, and the analyzer. Furthermore, when the light grasp is varied the angle at which various portions of the beam are incident on such optical elements varies. As a result of such changes in angle of incidence, the polarization plane of the beam is altered, thereby changing the relative positions required of the polarizer and analyzer to produce extinction. This introduces spurious indications of the amount of optical activity of the sample under investigation.

In order to minimize the effects of errors from this source, a system has been provided for varying the light grasp of a monochromator as a reproducible function of the wavelength during the scanning of the spectrum. Consequently, the error introduced at any wavelength is the same from one time to another. By reproducibly varying the light grasp of the monochromator as a function of wavelength during the scanning from one time to another, errors caused by variation in the light grasp as a function of wavelength are themselves reproducible. By rendering such errors reproducible they may be measured at the various wavelengths and such reproducible errors can therefore be taken into account and corrections made therefor.

In making precise measurements with a spectropolarimeter in which the light grasp is so varied, a spectrogram is first obtained with a blank specimen and then another spectrogram is produced with a test specimen and the difference in the measurements so obtained is employed to measure the optical activity of the test sample.

In the copending patent application Ser. No. 348,346, filed on Mar. 2, 1964, now abandoned, a system is disclosed for reproducing such errors from one scan of the spectrum to another. But such reproducibility of the error does not eliminate the error.

In practice it is found that the extinction position for the polarizer varies somewhat with wavelength even when the light grasp is varied. Such variations produce erroneous or spurious signals which, when added to the optical activity of the specimen under test, produces an erroneous indication of the optical rotation produced by the specimen. The origin of such errors lies partly in the fact that polarizers are imperfect and partly in the fact that the walls of the sample cell and other optical elements that lies between the polarizer and the analyzer and which are intended to have a non-polarizing characteristic does, nevertheless, produce some polarization and such polarization varies with the wagelength.

According to the present invention, a signal is introduced into the recording system which automatically subtracts from the signal produced with a test sample a zero-correction signal which corresponds to that which would exist with just a blank. Consequently, with this invention the recorder indicates automatically the optical activity of the test specimen. This invention is not only applicable in making measurements on one test sample but also on a series of test samples. When making measurements with a series of test samples, the zero-correction system is first set by making tests with a blank and then a series of spectropolarograms are then made one with each test sample. At least when the records are made for a series of test samples over a relatively short time period such as a day, the spectropolarograms so obtained may be compared to form a basis for the accurate determination of the optical activity of each of the respective samples at different wavelengths as well as for making comparisons between the optical activities of different samples.

The invention, together with the foregoing and other features and advantages thereof is described in connection with the accompanying drawings in which.

Figure 1:
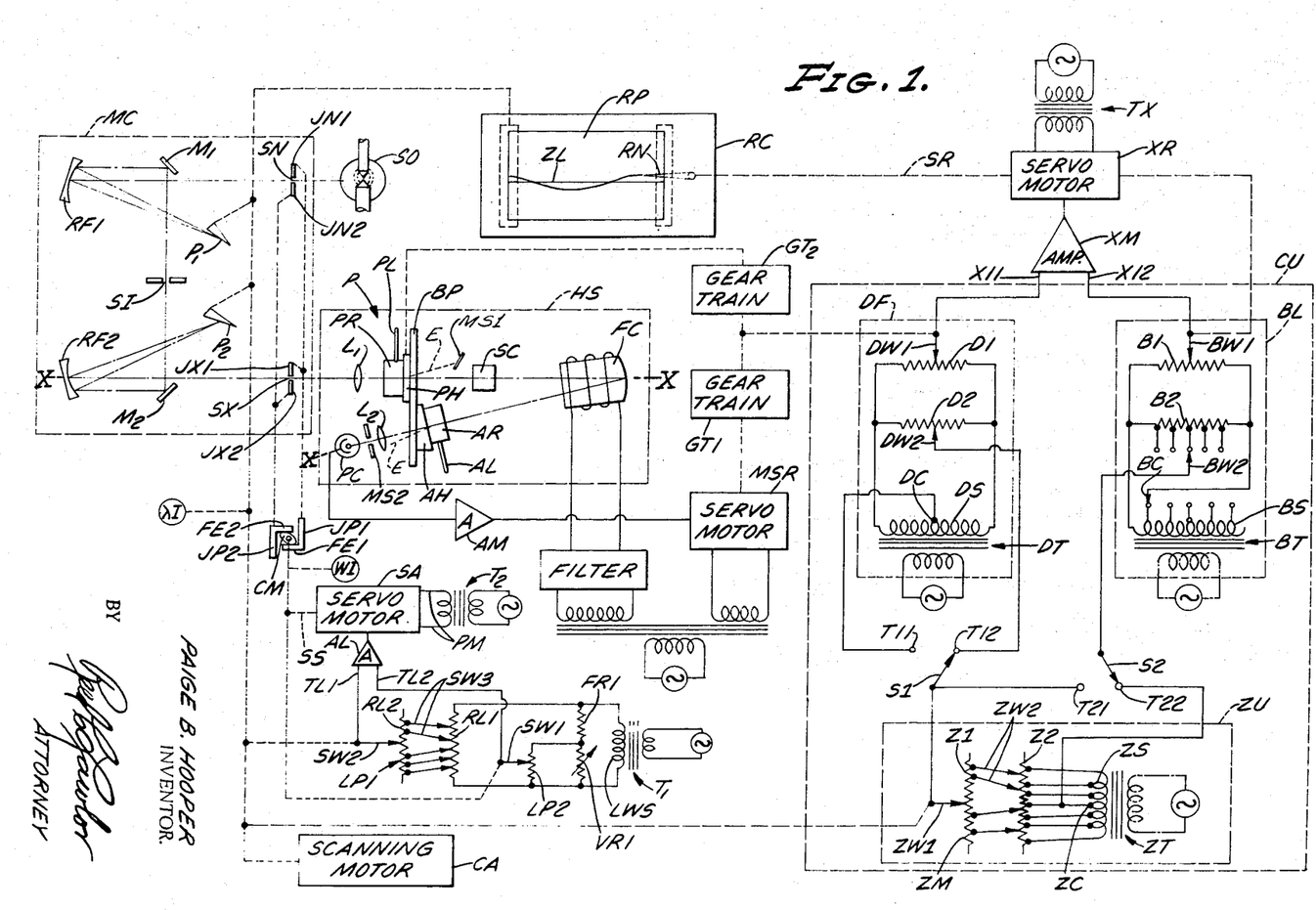
FIG. 1 is a schematic diagram of a spectropolarimeter embodying this invention.

In the spectropolarimeter illustrated in FIG. 1 white light from an intense source SO, such as a Xenon Arc lamp, enters a monochromator MC where it is dispersed spectrally so that a portion of the light in a narrow wavelength band is emitted from the monochromator. This emitted radiation is transmitted along an optical axis X—X through the polarimeter unit P. In the polarimeter, light travelling along the axis X—X passes through a first lens $L_1$, a polarizer PR, a sample cell SC, a modulator Faraday cell FC, an analyzer AR and a second lens $L_2$ to a photocell PC, all of which elements are mounted in a common light-tight housing HS. The polarimeter of FIG. 1 is of the extinction type. By this is meant that the plane of polarization of the beam that is incident on the analyzer AR after passage through the polarizer PR and the sample cell SC and the Faraday cell FC is perpendicular to the polarization plane of the analyzer thus minimizing the amount of light striking the photocell PC. In the spectropolarimeter illustrated, the polarizer PR and the analyzer AR are rigidly mounted on a common flotation baseplate BP in close juxtaposition to each other and the Faraday cell FC is provided with a mirror at one end thereof for reflecting to the analyzer the light that has been transmitted into the Faraday cell from the polarizer, as taught in copending patent application Ser. No. 348,346, filed on Mar. 2, 1964, by Henry H. Cary, now abandoned.

The monochromator MC is a double monochromator. The monochromator comprises an entrance slit SN into which radiation from the source SO is directed. This radiation is separated into its spectral components by means of a pair of dispersing prisms $P_1$ and $P_2$ thereby causing a spectrum of the radiation to be formed within the monochromator MC adjacent the exit slit SX.

Figure 2:
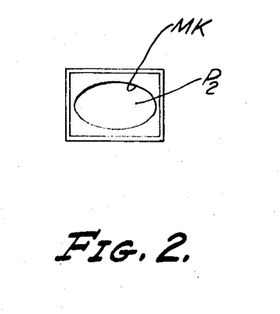
FIG. 2 is an elevation view of a dispersing prism showing an aperture-stop defining mask.

White light entering the entrance slit SN is directed to a first collimating mirror RF1 which reflects the radiation to the first dispersing prism $P_1$ which in turn returns dispersed radiation to the first collimating mirror RF1 and thence to the first flat mirror $M_1$ which in turn directs the focused spectrum of the radiation at an intermediate slit SI. The radiation that lies in a narrow band of wavelengths and that is transmitted through the intermediate slit SI is reflected by a second flat mirror $M_2$ to a second collimating mirror RF2 to the second dispersing prism $P_2$ which in turn disperses the radiation further and reflects the dispersed radiation to the collimating mirror RF2 which in turn focuses a spectrum of the radiation at the exit slit SX, thus causing monochromatic radiation of high purity to emerge from the exit slit SX along the optical axis X—X. A scanning motor CA coupled to the prisms $P_1$ and $P_2$ by means of cams causes the spectrum to be scanned by the exit slit SX and thus to change the wavelength of the emitted monochromatic radiation. The shape or grasp of the monochromatic beam that is emitted is defined by an aperture stop formed by a mask MK on the second prism $P_2$ (see FIG. 2) and by the aperture stop formed by the exit slit SX. In other words, the monochromatic radiation that is available for use by the polarimeter unit P is defined by a somewhat pyramidally-shaped or pie-shaped beam with the monochromator having at one end a base formed by the virtual image of the prism $P_2$ formed behind the second collimating mirror RF2 and having at the other end a peak defined by the narrow rectangular slit SX. The energy-transmitting capability of a beam is defined mathematically by the term "light grasp" which is defined as follows:

$$G = n^2 \frac{A_1 A_2}{L^2}$$

where $A_1$ = cross-sectional area of beam at one aperture stop, in this case the exit slit SX.

$A_2$ = cross-sectional area of beam at the other aperture stop, in this case the virtual image of the stop defined by a mask on the dispersing prism.

L=distance between the aperture stops.
n=effective index of refraction between the aperture stops.

The manner in which the light grasp is varied during the scanning of the spectrum is explained in detail hereinafter.

Figures 3, 4:
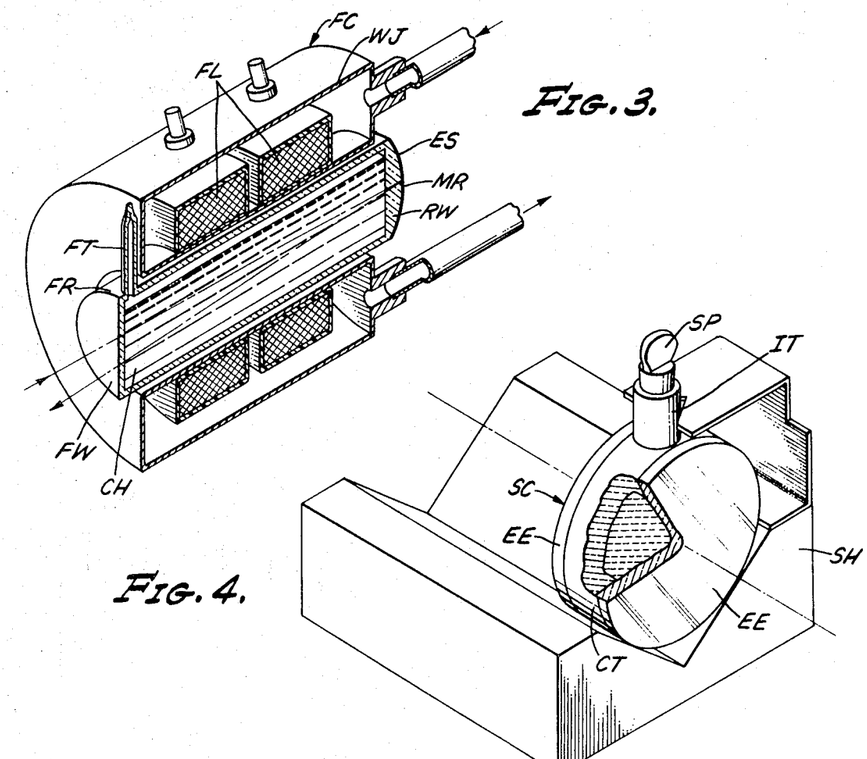
FIG. 3 is a cross-sectional view of a water-cooled Faraday cell employing water as the core material.
FIG. 4 is an isometric view of a sample cell, together with support.

As indicated in FIG. 3 the Faraday cell FC includes a water filled chamber CH having a plane parallel transparent front wall or window FW and a rear wall RW that has a flat interior surface and a spherical exterior surface ES. The rear wall RW has a mirror MR formed by a reflecting coating deposited on its exterior surface ES. Thus, in effect, the Faraday cell FC acts as a focusing element. A filler tube FT extends upwardly from the chamber CH. In the specific embodiment of the invention described, the chamber CH is filled with water, leaving a small gas space in the filler tube FT and in the upper portion of the chamber CH to accommodate expansion and contraction caused by temperature changes. The water filled chamber CH constitutes a Faraday core FR. The Faraday coil FL in this case consists of a pair of annular windings mounted within an annular water jacket WJ and concentrically with the core FR. Excessive heating of the Faraday cell otherwise caused by electric power that is dissipated in the coil is prevented by constantly flowing cooling water through the water jacket while the cell is in use.

In the spectropolarimeter of FIG. 1, the first lens $L_1$ forms a real image of the aperture stop within the sample cell SC and an image of the monochromator exit slit SX at infinity. The mirror MR of the Faraday cell FC forms a real image of the exit slit SX between the Faraday cell and lens $L_2$. The second lens $L_2$ forms a virtual image of the aperture stop to the left of the sample cell SC. The second lens $L_2$ forms a real image of the aperture stop at the photocell PC. The principles by means of which the focal lengths of the lenses $L_1$ and $L_2$ and the focusing mirror MR are designed and the principles by means of which the various parts of the polarimeter can be spaced along the optical axis X—X relative to each other to cause the various images to be formed at specified locations are well known in the art and need not be described herein.

The sample cell SC is located on the branch of the optical axis X—X between the polarizer PR and the Faraday cell FC.

The polarizer PR and the analyzer AR may be of conventional type such as a Senarmont or a Rochon prism PZ and PA. Each of these prisms permits an ordinary ray to be transmitted along a straight line therethrough but causes an extraordinary ray E (see FIG. 1) to be deflected from that straight path. The planes of polarization of the ordinary and extraordinary rays are perpendicular to each other. The plane of polarization of the ordinary ray is here referred to as the plane of polarization of the polarizer PR or the analyzer AR as the case may be. A black mask MS1 mounted within the housing HS is employed to absorb the extraordinary ray passing through the polarizer PR. Likewise, an apertured mask MS2 is employed to permit only the ordinary ray passing through the analyzer AR to be transmitted to the photocell PC.

Figure 5:
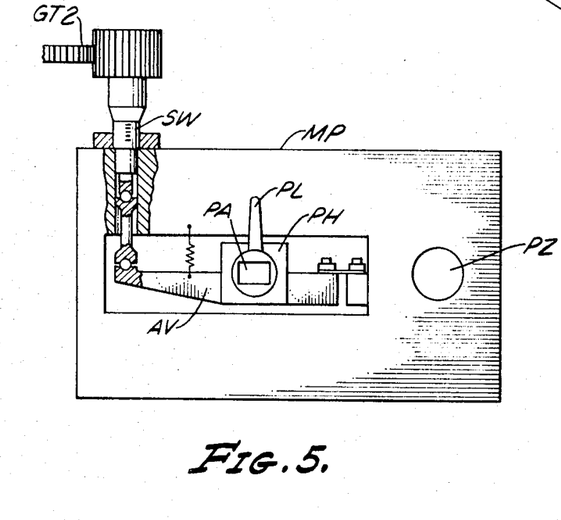
FIG. 5 is a detailed diagram of a type of mounting that may be employed with a rotatable polarizer.

Both the polarizer PR and the analyzer AR are rotatably mounted in corresponding housings PH and AH which are mounted upon a common mounting plate MP as shown in FIG. 5. Both the polarizer PR and the analyzer AR can be rotated on the respective housings and set in fixed positions in those housings by manipulation of levers PL and AL attached thereto. The housing AH in which the analyzer AR is mounted is fixed on the plate MP. However, the housing PH in which the polarizer PR is mounted is in turn mounted on a lever which is pivotally attached by means of a spring on the plate MP. This lever AV is rotatable about its pivot through the action of a gear train that actuates a screw engaging the end of the lever remote from its pivot.

To prepare the polarizer for use, monochromatic radiation is projected into the polarizer unit P from the monochromator without a simple in place and the polarizer PR is set for maximum light transmission from the monochromator and the analyzer AR is adjusted in its housing to produce an extinction condition while the lever AV is located at a point in the mid-range of its angle of rotation. To achieve this result, the polarizer PR can be removed temporarily and the analyzer AR rotated in its housing to produce a minimum current of fundamental frequency in the photocell PC. In this operation advantage is taken of the fact that the radiation emitted from the monochromator MC is itself polarized by virtue of the action of the dispersing prisms $P_1$ and $P_2$. After the analyzer AR has been set in such position, the polarizer PR is then replaced and is rotated to set it in such position that the polarized radiation transmitted through the polarizer PR is extinguished by the analyzer AR. In this condition, the plane of polarization of the polarizer PR is parallel to the polarization plane of the radiation emitted from the monochromator, thus attaining most effective use of the radiation emitted from the monochromator.

Thereafter, when a sample is placed in the sample cell, the screw SW is operated automatically in response to the output of the photocell PC as explained hereinafter to rotate the polarizer PR through an angle equal and opposite to the angle through which the sample rotates the polarized beam.

As indicated in FIG. 4, the sample cell SC is of cylindrical configuration consisting of a cylindrical tubular member CT and two flat endwalls EE, EE. Each of the endwalls is in the form of a flat plate having parallel surfaces. A vertical inlet tube IT, and stopper SP are provided to permit changing liquid samples. A suitable sample holder SH is mounted in the housing HS to facilitate mounting the sample chamber SC in place in a repeatable manner.

In the specific embodiment of the invention illustrated herein, alternating current of fixed fundamental frequency is supplied to the Faraday coil from a power source PS, thus causing the magnetic field along the axis of the Faraday core FR to reverse alternately, varying in intensity in a sinusoidal manner. When this occurs, the alternating magnetic field causes the plane of polarization of the light that is transmitted from the sample to the reflecting mirror MR and thence to the analyzer AR to be oscillated about the axis of the beam in a similar almost sinusoidal manner. As a result even when the average position of the beam striking the analyzer AR is perpendicular to the plane of polarization of the analyzer AR an alternating current is generated in the photocell PC. In practice, a photomultiplier is used as the photocell PC.

It can be shown that at least for small angles of rotation of the plane of polarization incident on the analyzer AR, the component of the alternating current generated by the photocell which is of fundamental frequency, has an amplitude that is proportional to the deviation of the polarization plane from the extinction position and a polarity or phase that depends upon the direction of such deviation from the extinction position.

In the spectropolarimeter of this invention the current developed by the photocell PC is selectively amplified by a tuned amplifier AM to amplify the AC current component of fundamental frequency. This amplified current is applied to a servomotor SM which operates through a first gear train $GT_1$ to operate a pen recorder RC and through an additional gear train $GT_2$ to operate the screw SW in such a way as to restore the plane of polarization incident upon the analyzer AR to its extinction position.

In the spectropolarimeter of this invention the wavelength of the radiation emitted from the monochromator MC is varied during an analysis of a specimen by operation of the scanning motor CA and the light grasp of the monochromator is varied as a predetermined function of the wavelength.

In the monochromator MC the entrance slit SN and the exit slit SX are each defined by a pair of slit jaws JN1, JN2 and JX1 and JX2. The two jaws JN1 and JX1 on one side of each of the slits SN and SX respectively, are formed by parallel edges of a common plate JP1. Similarly, the two jaws JN2 and JX2 on one side of each of the slits SN and SX respectively, are formed by parallel edges of a common plate JP2. Means including a cam CM engaging parallel follower elements FE1 and FE2 on the respective plates JP1 and JP2 are employed for adjusting the slit widths. The spacing of the pair of jaws JN1 and JX1 on the plate JP1 is equal to the spacing between the jaws JN2 and JX2 of the plate JP2 so that the two slits SN and SX always have the same widths. A slit width adjusting mechanism of this type is described and claimed in U.S. Pat. No. 3,098,408 that issued to Henry H. Cary on July 23, 1963.

In accordance with the slit width control mechanism disclosed in my copending patent application Ser. No. 348,348 filed on Mar. 2, 1964, now abandoned, the cam CM is coupled to the scanning motor CA in such a way that the widths of the slits SN and SX can be varied synchronously during the scanning in accordance with a predetermined and reproducible function of the wavelength of the radiation emitted from the monochromator MC. In the monochromator illustrated in FIG. 1 the cam CM is mounted on the output shaft SS of the servomotor SA. This motor is supplied with power from the power mains PM and also with power from the output of a differential amplifier AL. One input terminal TL1 is supplied with an AC voltage from a special potentiometer LP1 driven by the scanning motor CA and the other input terminal TL2 is supplied with an AC voltage from a special potentiometer LP2 driven by the servomotor SA. In this monochromator a voltage is developed on the potentiometer LP1 of a value which will cause the servomotor to set the widths of the slits SN and SX at a predetermined value at each wavelength and the servomotor SA cooperates with the potentiometer LP2 to cause the widths of the slits to assume that value automatically as required.

More particularly, the slit width control potentiometer LP1 is of the so-called multipot type. It includes a plurality of potentiometer windings RL1 connected across the secondary winding LWS of a transformer LT. The multipot unit LP1 also includes a second potentiometer winding RL2. A single sliding, or movable, contact SW2 coupled to the output shaft of the scanning motor CA engages the second potentiometer winding RL2 and is moved along the length thereof from one end thereof to the other automatically while the scanning motor CA rotates the dispersing prisms $P_1$ and $P_2$ of the monochromator MC. A plurality of contacts SW3 are connected to fixed taps on the potentiometer winding RL2 and are movable along the length of the other potentiometer winding RL1. The contacts SW3 are set at positions on the potentiometer winding RL1 suitable for causing voltages at corresponding taps on the potentiometer winding RL2 to correspond to the desired slit widths at the various wavelengths to which the position of the contact SW2 corresponds during the scanning. In practice, instead of employing a single winding RL1, a plurality of such windings are connected in parallel and a separate contact SW3 is associated with each, all as is well known in the art.

The second potentiometer LP2 is shunted by a variable resistor VR1 which is connected in series with a fixed resistor FR1 across the secondary winding LWS. The contact SW1 associated with the potentiometer LP2 is connected mechanically to the output shaft SS of the servomotor LM. As a result, a voltage is developed at the contact SW1 corresponding to the angular position of the shaft SS.

In operation, as the scanning motor CA rotates the prisms P1 and P2 to cause the wavelength of the radiation emitted from the exit slit SX to vary, the scanning motor moves the contact SW2 along the length of the potentiometer winding RL2 thereby causing a variable voltage to be applied to the input terminal TL1 of the differential amplifier AL. Simultaneously a voltage is applied to the second input terminal TL2 of the differential amplifier AL from the contact SW1 of the potentiometer LP2. If the voltages to the two inputs TL1 and TL2 are equal the servomotor LM remains at rest. But if they are different the servomotor LM rotates at a speed dependent upon the difference and in a direction depending upon the polarity, or phase, of the difference. Power is supplied to the servomotor from the transformer $T_2$ with such a phase as to rotate the shaft SS in a direction to change the slit width in an appropriate direction. Simultaneously, the shaft moves the contact SW1 to reduce the difference in voltages applied to the two input terminals TL1 and TL2 so that when the width of the slits has been adjusted by the servomotor to a value corresponding to the potential applied to the input terminal TL1 an equal voltage will be applied to the input terminal TL2 bringing the servomotor to rest.

In connection with the foregoing discussion it is to be borne in mind that there are numerous types of servomotors which may be employed for this purpose. In one type the servomotor is provided with a rotor winding and a stator winding. In one type of such servomotor, the stator winding is provided with shaded poles so that when AC current is applied to the winding, it creates a rotating magnetic field in the space in which the rotor is located, causing the rotor to rotate in one direction or the other, according to the phase of the AC current applied to the rotor. Thus, for example, the rotor winding can be supplied with power from a power transformer $T_2$ and the shaded-pole stator winding can be supplied with power from the output of the differential amplifier AL. By employing a common core for the two transformers $T_1$ and $T_2$, and properly phasing the secondary windings, the servomotor operates to set the slit width at the desired point corresponding to the position of the contact SW1 on the potentiometer LP2. If there is any error in the phasing of the secondary windings, this can be corrected by reversing the connections of one secondary winding or the other to the circuit to which it is connected.

With the multipot arrangement the contacts SW3 are set at such positions that the width of the slit will have predetermined values at a series of wavelengths throughout the wavelength range of the spectrum in which the analysis is being made. In order to match a predetermined set of specifications for variation of slit width with wavelength, a large number of slit width contacts SW3 are employed. For example, in order to set the wavelength of the slit width accurately at a large number of wavelengths throughout the range from say 2500 A. to about 6000 A. thirty such slit width contacts are employed. To aid in scheduling the variations in control voltage applied to the contact SW2 a slit width indicator WI is connected to the output shaft SS of the servomotor. A wavelength indicator λI is also coupled to the shaft of the scanning motor. With this arrangement, the scanning motor may be operated, as by manipulation of a switch (not shown), to set the monochromator at a succession of wavelengths indicated by the wavelength indicator λI one at a time. As this is done the contact SW2 is set automatically at a corresponding series of positions along the length of the potentiometer winding RL2. The contact SW3 closest to that position is then moved along the length of the potentiometer winding RL1 to such a position that the slit width has a desired value as indicated by the slit width indicator WI. This process is repeated for successive wavelengths and is then repeated for the entire spectrum a number of times until the slit width varies with wavelength in the manner desired. Usually two repetitions in settings are sufficient.

The manner in which the contacts are set to produce uniform dispersion throughout the spectrum or to set the intensity of the monochromatic radiation at values desired at various parts of the spectrum, are described in more detail in my aforesaid copending patent application Ser. No. 348,348. In any event, as will be apparent any shifts in the plane of polarization of the beam being transmitted through the polarizer that are caused by variations in the light grasp of the entering beam are uniform from one scanning of the spectrum to the other. Errors that might otherwise occur from this source are not simply made reproducible from one scanning of the spectrum to the other, but are substantially eliminated in accordance with the present invention. Errors can also arise because of variations in rotation of the beam that occur by virtue of the fact that the beams utilize different portions of the surfaces of the sample cell and the Faraday cell and other optical elements that lie at various points in the optical path in the polarimeter as the wavelength is varied.

In this invention, a control unit CU is provided substantially eliminating errors that would otherwise occur in the measurement from one wavelength to another and from one specimen to another. The control unit CU includes a zero-correction sub-unit ZU, a deflection signal sub-unit DF, and a balancing sub-unit BL. The zero-correction sub-unit makes such zero-correction possible throughout the entire spectrum. The balancing sub-unit BL makes it possible to shift the zero level to facilitate recording on an enlarged scale the significant data of a spectropolarogram. The balancing sub-unit BL also makes it possible to record different spectropolarograms, and even different part of the same polarogram to different scales.

More particularly, in the illustrated embodiment of the spectropolarimeter of this invention, the recording pen RN is moved transversely of the length of the recording paper RP by amounts that depend partly upon the rotation of the shaft SR of the main recording servomotor MSR and partly by the action of the control unit CU. The pen is directly driven by an auxiliary servomotor XR under the control of the output of an auxiliary differential amplifier XM. The differential amplifier XM has a pair of input terminals XI1 and XI2. To control the operation of the pen a deflection voltage is applied to input terminal XI1. The deflection voltage is established partly by the action of the zero-correction sub-unit ZU and partly by the action of the main servomotor MSR on the deflection signal sub-unit DF. A voltage is supplied to the other input terminal XI2 from the balancing sub-unit BL which is controlled by the auxiliary servomotor XR itself.

In order to effect the various actions desired, power is supplied to the auxiliary servomotor XR from the power mains through a transformer TX. When the deflection voltage applied to the input XI1 equals the balancing voltage applied to the input XI2 the servomotor remains stationary. But when they are different the shaft of the servomotor XR rotates in a direction that depends upon whether the deflection voltage is greater than or less than the balancing voltage and at a speed that depends upon the differences in these voltages. Power is supplied through the auxiliary servomotor XR in such a phase in relationship to the voltages supplied by the deflection signal sub-unit DF and the balancing sub-unit BL that the system is self-balancing thus causing the pen RN to deflect an amount and in a direction that depend upon the amount and polarity of the deflection voltage.

The zero-correction sub-unit ZU includes a potentiometer ZM of the so-called multipot type. It includes two potentiometer windings Z1 and Z2. The second potentiometer Z2 is connected across the secondary winding ZS of a transformer ZT. A single sliding contact ZW1 coupled to the output shaft of the scanning motor CA engages the first potentiometer winding Z1 and is moved along the length thereof from one end thereof to the other automatically while the scanning motor CA rotates the dispersing prisms $P_1$ and $P_2$ of the monochromator MC. A plurality of sliding contacts ZW2 are connected to fixed taps on the first potentiometer winding Z1 and are movable along the length of the second potentiometer winding Z2. The contacts ZW2 are set at positions on the second potentiometer winding Z2 suitable for setting the voltages at corresponding taps on the first potentiometer winding X1 at values sutiable for correcting the shifts in the zero reading of the spectropolarimeter at various wavelengths as the contact ZW1 moves along the first potentiometer winding Z1. In order to insure constant voltage distribution along the potentiometer winding Z2 irrespective of the settings of the contacts ZW2, a series of taps on that winding Z2 are connected to stationary taps on the secondary winding ZS of the transformer ZT. The manner in which the contacts ZW2 are adjusted, is described more fully hereinafter.

The deflection signal unit DF includes two potentiometer windings D1 and D2 which are connected in parallel across the secondary windings DS of the transformer DT. A switch S1 is provided with contacts T11 and T12 to permit the contact ZW1 of the potentiometer Z1 to be selectively connected either to a center tap DC on the secondary windings DS or to a contact DW2 of the potentiometer winding D2. The contact DW1 of the potentiometer D1 is electrically connected to the input terminal XI1 of the auxiliary amplifier XM. It is mechanically connected to the main servomotor MSR through the gear train GT1 so that it is moved along the length of the potentiometer D1 to a position corresponding to the angular position of the output shaft of the servomotor MSR.

The balancing unit BL includes two potentiometer windings B1 and B2 which are connected in parallel across the secondary windings BS of the transformer BT. A switch S2 is provided with contacts T21 and T22 to permit the switch BW2 associated with the winding B2 to be selectively connected either to a center tap on the secondary winding ZS or to the contact ZW1 of the potentiometer winding Z1. The contact BW1 of the potentiometer B1 is electrically connected to the input terminal XI2 of the auxiliary amplifier XM. It is mechanically connected to the auxiliary servomotor XR so that it is moved along the length of the potentiometer B1 to a position corresponding to the angular position of the output shaft of the auxiliary servomotor XR.

For maximum accuracy, the AC signals appearing across the secondary windings ZS, DS, and BS are all in the same phase and are maintained in fixed proportions while the spectropolarimeter is in use. Such identity of phases and constancy of proportions can be produced most easily by arranging the transformers ZT, DT, and BT on a common core. In this case, only a single primary winding is employed for the three transformers.

The switch BC is selectively connectable to taps on the secondary winding BS and is employed for changing the scale of the recording or the sensitivity of the spectropolarimeter. The switch BW2 is employed for shifting the zero level of the recording by large discrete steps. The contact DW2 is employed for shifting the zero level of the recording continuously a variable amount.

For purposes of explanation, let us assume an initial condition in which the switch BC has been set to produce maximum sensitivity and in which the switch BW2 and contact DW2 have been set to establish the baseline ZL about one-fourth the way from one edge of the strip of recording paper RP. Let us further assume for purposes of explanation that the switch S2 has been set to close contact T22 to connect the center tap of the secondary winding ZS to the switch BW2 and that the switch S1 has been set to close the contact T11 to connect the contact ZW1 of the potentiometer winding Z1 to the center tap of the secondary winding DS.

For purposes of explanation, let us also assume an initial condition in which all of the contacts ZW2 have been set at the same point on the potentiometer winding Z2 so that the voltage is the same at all points on the potentiometer winding Z1.

In operation, under the foregoing conditions, as the scanning motor CA rotates the prisms $P_1$ and $P_2$ to vary the wavelength of the radiation emitted from the exit slit SX, the scanning motor also moves the contact ZW1 along the potentiometer winding Z1 from one end thereof to the other. However, under the assumed conditions, the voltage supplied by the zero-correction unit ZU remains constant. As the scanning motor CA operates, the wavelength of the monochromatic radiation emitted from the exit slit SX varies and the radiation is transmitted through the polarizer PR, the sample cell SC, to the Faraday cell FC, and thence through the analyzer AR to the photocell PC. The AC current of fundamental frequency is amplified by the tuned amplifier AM and is fed to the main recording servomotor MSR. The servomotor operates through the gear train GT1 and GT2 to rotate the polarizer PR to the extinction condition at each wavelength during the scanning. Simultaneously, the main servomotor drives the contact DW1 on the potentiometer winding D1 through the gear train GT1. As a result of this action, a deflection voltage is applied to the input terminal XI1. For the purpose of this analysis the total deflection voltage applied to the terminal XI1 may be taken as the voltage that appears between the center tap ZC of the secondary winding ZS of the transformer ZT and the slidewire DW1 driven by the servomotor. This voltage is the total voltage accumulated by tracing the circuit through the potentiometer winding Z2, the contacts ZW2, the potentiometer winding Z1, the contact ZW1, the switch S1, the secondary transformer winding DS of the transformer DT, and the potentiometer winding D1. Simultaneously, a balancing voltage is applied to the other input terminal XI2 of the differential amplifier XM. For the purpose of this analysis the balancing voltage may be taken as the total voltage accumulated by tracing the circuit from the center tap ZC of the secondary winding ZS of the transformer ZT, the switch BW2, the potentiometer B2, the potentiometer B1, and the contact BW1. As explained previously, if the voltages applied to the input terminals XI1 and XI2 differ, an AC current is applied to the auxiliary servomotor XR causing it to rotate to drive the pen RN to a position on the recording paper corresponding to the rotation of the shaft of the main servomotor MSR and hence to the angle required to rotate the polarizer PR to compensate for any rotation introduced by the sample cell or otherwise on the path between the polarizer PR and the analyzer AR. As the auxiliary servomotor XR rotates it drives the wiper arm BW1 on the potentiometer B1 in such a direction as to reduce the magnitude of the difference in voltages of the signals applied to the input terminals XI1 and XI2.

Figure 6:
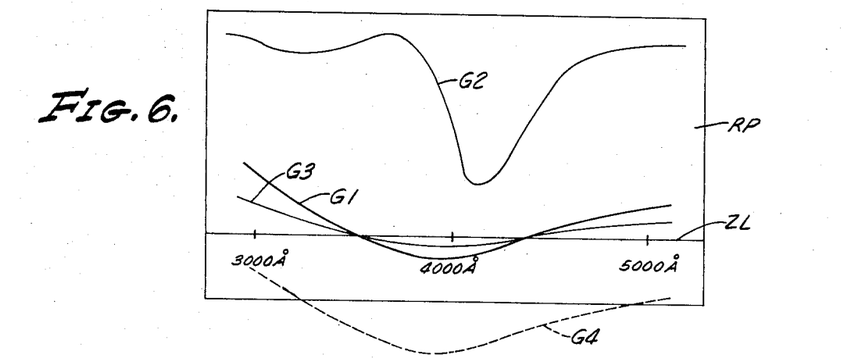
FIG. 6 is a record referenced in explaining the invention.

In FIG. 6 there are illustrated graphs G1 and G2 representing the manner in which the plane of polarization is rotated as a function of wavelength. Graph G1 represents recordings made with the sample cell blank and graph G2 represents a recording made with a test specimen in the sample cell. The graph G1, in effect, represents the zero-line from which measurements of optical activity of a specimen are to be measured. This graph G1 deviates by different amounts at different wavelengths from a straight baseline ZL. The zero-line G1 can also be recorded by setting switch S2 to close contact T21 removing the zero-correction unit ZU from the circuits that operate the servomotor XR.

Before considering the method of zero-correction employed in this invention, it is advantageous to refer to some of the alterations that can be made in the recording by manipulation of various parts of the deflection signal sub-unit DF and the balancing sub-unit BL. By manipulating the sentivity switch BC, the scale of the recording may be reduced from its maximum value by a constant factor throughout the spectrum. A graph G3 corresponding to the zero recording G1 obtained by multiplying the sensitivity by a factor of one-half is indicated in FIG. 6. By manipulating the zero-shift switch BW2 the recordings may be moved up and down on the recording paper. In FIG. 6 the phantom graph G4 represents a condition which would arise if the baseline ZL were beyond the edge of the recording paper. By setting the switch S1 to close the contact T12 instead of T11 the graphs G may be moved slight amounts by manipulation of contact DW2 in the deflection signal unit. By setting the switch S2 to close the circuit to the control T21 the zero-correction unit ZU can be removed from the circuit across the input terminals XI1 and XI2. It will be noted that setting of the switch BW2 causes the baseline of the recording to be shifted by a fixed percentage of the record width regardless of the setting of the sensitivity or range established by switch BC. It will also be noted that the adjustment of the wiper arm DW2 introduces an increment in pen displacement proportional to a given offset in rotation angle. Whether this increment is represented on the chart by a large displacement or a small one depends upon the range as established by the setting of the switch BC.

Setting aside the methods just described, we now return to give consideration to the action of the system when the switch S1 is set to close the contact T12 and switch S2 is set to close the contact T22 and the switches BW2 and BC are set as previously described to produce the recording G1. A test specimen is now placed in the sample cell and the scanning operation is repeated. If this is done to record on the same portion of the recording paper, then a graph G2 representing the effect that the sample has on the rotation of the plane of polarization is produced. The optical activity produced at any particular wavelength may be ascertained from the graphs G1 and G2. To ascertain the optical activity of the sample at any wavelength the reading on the graph G2 corresponding to that wavelength may be subtracted from the reading on graph G1 corresponding to that wavelength. In other words, the distances between these graphs is measured at each wavelength. The need for performing such subtraction operation to facilitate the analysis of individual specimens and for comparing analyses from several specimens is eliminated in accordance with this invention by manipulating the zero-correction sub-unit ZU to flatten out the zero-graph G1 so that compensation is made automatically for differences in the errors in the position of the polarizer PR at various wavelengths.

In order to provide the needed zero-correction, a series of tests are made with the sampled cell SC blank. With the sample cell blank, the scanning motor CA is operated intermittently to set the monochromator MC to project radiation of various predetermined wavelengths through the polarimeter P. While the monochromator is set at each wavelength, the main servomotor MSR rotates the polarizer PR to such a position as to produce extinction at that wavelength. At the same time the scanning motor CA sets the contact ZW1 in the zero-correction sub-unit at a position on the potentiometer winding Z1 corresponding to that wavelength. While the contact Z1 is so set the contact ZW2 nearest to it is moved on the potentiometer winding Z2 to a position which causes the pen RN of the recorder to establish itself on the straight baseline ZL. The monochromator is then set at a new wavelength and the process is repeated with a new contact ZW2. The process is repeated at each of several wavelengths. As a result the graph G1 is corrected to a large extent bringing it more nearly into coincidence with the straight baseline ZL. The entire process may be repeated once or several additional times for the entire series of wavelengths to improve the corrections. When a spectrogram is then recorded throughout the entire spectrum the resultant correction line may appear like the graph G5 represented on the record of FIG. 7.

Figure 7:
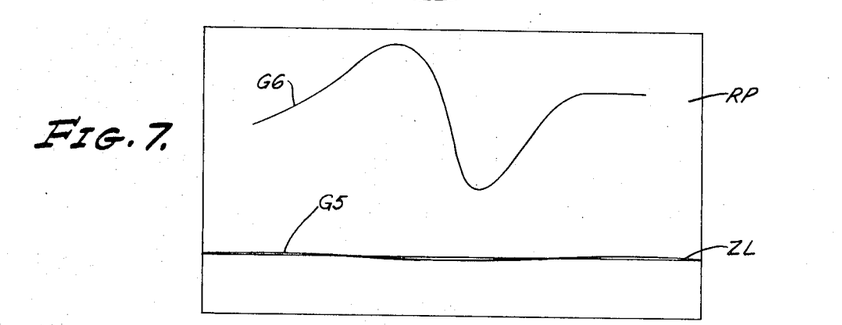
FIG. 7 is a spectropolarogram made in accordance with this invention.

Thereafter, when a test sample is placed in the sample cell a spectropolarogram G6 may be produced which is substantially free of zero errors at various wavelengths.

By manipulation of the switches S1 and S2, and the switch B2 and contact DW2, the baseline may be moved up and down or even off the recording paper and the graph representing the spectropolarogram of the specimen may be recorded to any desired scale and at any desired place on the recording paper.

Figure 8:
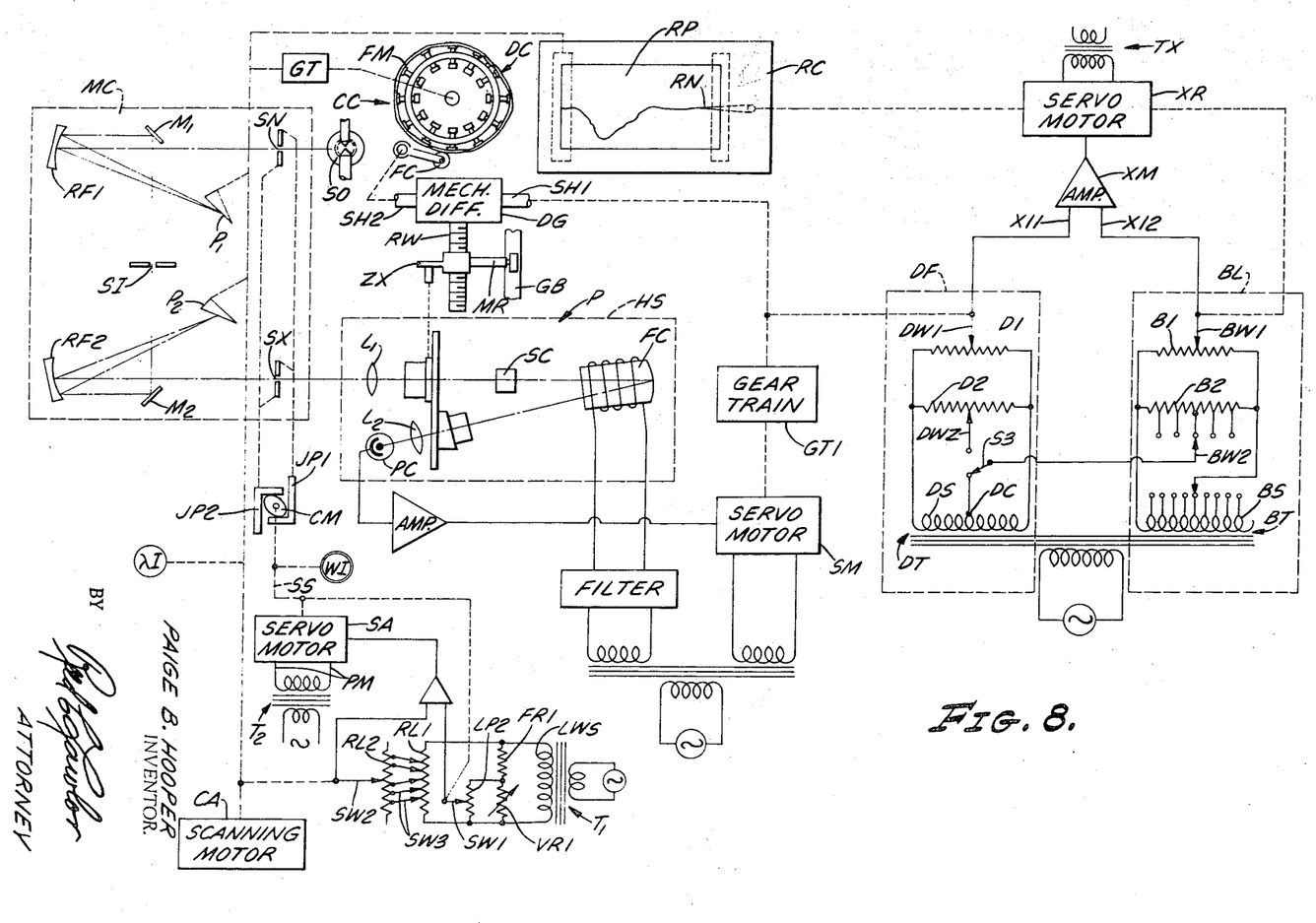
FIG. 8 is a schematic diagram of an alternative form of spectropolarimeter embodying this invention.
Figure 9:
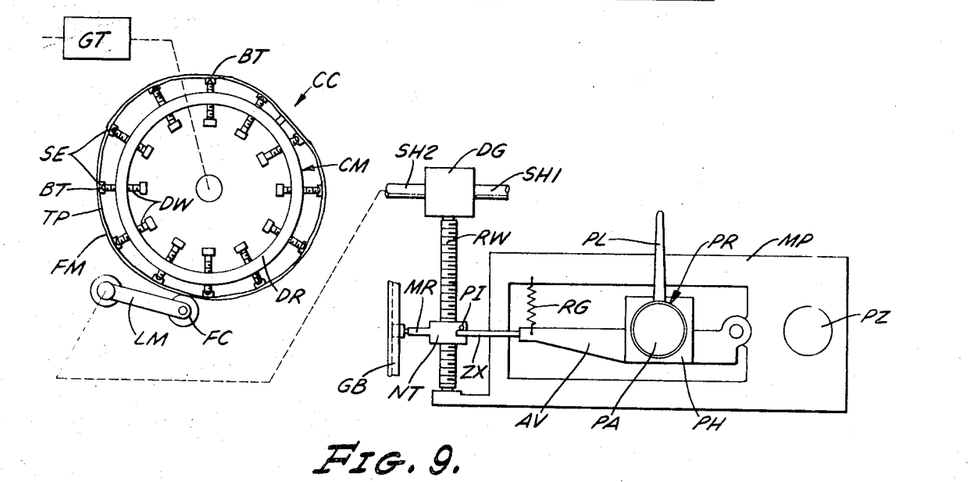
FIG. 9 is a detailed drawing of a portion of the spectropolarimeter of FIG. 8.

There are many other ways for correcting the zero line of a spectropolarimeter in accordance with this invention. A mechanical arrangement for rotating the polarizer by variable amounts that depend upon wavelength to produce such corrections instead of employing a multipot unit is illustrated in FIGS. 8 and 9. In this arrangement, a switch S3 is employed to connect the switch BW2 to the center tap DC of the secondary winding DS or to the slidewire DW2 of the deflection signal unit DF so that changes in scale and both close and fine adjustments of the location of the baseline may be made. In this case, the screw RW that rotates the polarizer PR is driven through a differential gear DG which has first and second input shafts SH1 and SH2, which are driven respectively by the main recording servomotor MSR and by a correction cam unit CC comprising a driving cam CM and a follower cam FC. In this case, the screw RW acts on the lever AV of the polarizer through a follower nut NT that threadably engages the screw RW and is supported against rotation by means of an arm MR that rides in a guide channel bar GB. An arm ZX extending from the lever AV is pressed by a spring RG against a pin PI on the nut NT. As the screw RW rotates under the action of the differential gear DG, the nut is advanced along the axis of the screw RW rotating the level AV on which the polarizer PR is mounted in the required direction. In this case the zero-correction is made by means of an adjustable follower cam FM which is mounted on a drum DR which is rotated by the scanning motor CA. The driving cam CM is adjusted radially on the drum DR to rotate the shaft SH2 by an amount depending upon wavelength to produce the desired zero-correction. The follower cam FC is of the roller type and is attached by means of a lever LM to the shaft SH2.

The adjustable cam is in the form of a strip TP of flexible material such as neoprene. This strip TP has a series of slotted elements SE attached along the length thereof on the inner side thereof for receiving ball tips BT of adjusting screws DW that project radially outwardly through the drum DR. Inasmuch as the angular corrections required for rotating the polarizer PR to provide the desired zero-corrections are small, little peripheral slippage is required between the slotted elements SE and the ball tips BT. In fact for best effects it is desirable to mount a reducing gear between the lever LM and the shaft SH, in order to permit the use of larger differences in radii for the driving cam DC at various angular positions on the drum.

In order to shape the driver cam a blank sample cell SC is located in the polarizer and the scanning motor CA is operated to set the monochromator at a succession of wavelengths. As the scanning motor rotates it rotates the drum in the cam DC beneath the follower cam FC. While the monochromator is set at each of a succession of wavelengths the adjusting screw DW nearest the follower cam FC is turned to move it radially to rotate the polarizer PR through the action of the differential gear DG and the screw RW to bring the recording pen RN into a zero position at the baseline. This process may be repeated several times in order to produce good correction throughout the entire spectrum.

Once the zero-correction has been entered on the drum by manipulation of the screws DW, the equipment is ready for measuring of the optical activity of a test specimen throughout the entire spectrum. To make such a measurement, a test specimen is placed in a sample cell and the scanning motor CA is operated to cause the exit slit SX to scan the spectrum throughout the range of wavelengths of interest. As the scanning motor CA rotates, the wavelength of the radiation entering the polarimeter P changes and the polarizer PR is rotated to produce extinction at each wavelength by the combined action of the servomotor MSR and the correction cam CM on the screw RW through the differential gear DG.

It is thus seen that this invention makes it possible not simply to make the errors reproducible from one run to another but also makes it possible to correct for the zero errors throughout the entire wavelength range of the spectrum. As a result, with this invention spectropolarograms may be recorded for a succession of samples from which the optical activity of the sample throughout the spectrum can be readily ascertained for a series of specimens. This facilitates analysis of a single specimen and also facilitates comparisons of analyses of different specimens.

It will be understood that this invention is not limited to the particular embodiments thereof that have been described but that it may be embodied in many other forms within the scope of the appended claims. More particularly, it will be understood that many of the advantages of this invention may be obtained in measuring other optical rotatory properties of specimens than natural optical activity. It may be employed especially advantageously for the measurement of the Verdet constant of specimens while subjecting the specimen to the action of a magnetic field while the recording is being made.

The invention claimed is:

1. In a spectropolarimeter, the combination of:
monochromatizing means for projecting a beam of monochromatic radiation as polarized light through a sample and through an optical system including optical elements, which system has radiation transmission properties that vary in accordance with the polarization characteristics of the polarized light, and thence to means including a photodetector that is selectively responsive to a predetermined polarization component of polarized light, said monochromatizing means including dispersing means for establishing the wavelength of the projected monochromatic beam;

scanning means coupled to said dispersing means for varying the wavelength of the projected monochromatic beam;

means controlled by said photodetector for developing an uncorrected output signal dependent on how the polarization of a polarized component of the beam reaching said selectively responsive means has been modified by placement of a test sample in the beam;

correction means including a plurality of independently adjustable elements for developing a correction signal which varies as a function of wavelength in a predetermined manner in order to counteract polarization rotation effects of said optical elements in order to produce a constant reference output when a reference sample is in place in the beam;

means coupled to said scanning means and operating on said correction means to provide a correction signal corresponding to the respective wavelength of the projected monochromatic beam;

subtractor means for subtracting the correction signal from the uncorrected output signal at each of a succession of wavelengths to provide a corrected output signal;

said correction means comprising:
a multipot including a first potentiometer winding means having a first wiper arm movable along the length thereof by said coupled means,
a second potentiometer winding means having a plurality of wiper arms associated therewith acting as such independently adjustable elements for establishing correction voltages at various points along the length of said first winding means corresponding to different predetermined wavelengths, said subtractor means comprising a differential amplifier having first and second inputs;

means responsive to said uncorrected signal for applying a voltage proportional thereto to said first input, means connecting said first wiper arm to said second input, thereby providing at the output of said amplifier a corrected output signal in the form of an electric signal proportional to the difference between the signals applied to its two inputs, and utilization means controlled by said corrected output signal.

2. A spectropolarimeter as defined in claim 1 wherein said utilization means comprises a recorder including a recording element operated by the output of said amplifier, and means controlled by said scanning means for driving a recording medium relative to said recording element as the wavelength of the monochromatic radiation is changed.

3. In a recording spectropolarimeter having a recorder comprising a recording element for recording signals on a recording medium, and having scanning means for moving said recording medium relative to said recording element as the wavelength of plane polarized radiation transmitted to a sample is changed, the polarized radiation traveling along a predetermined path that includes optical elements that rotate the polarized radiation differently a different wavelengths during the scanning thereby affecting the zero-level of the recorder by amounts that vary as a function of the wavelength, a zero-level compensator comprising:

correction means controlled by said scanning means for supplying a correction voltage that varies as a function of the wavelength of the polarized radiation;

said correction means comprising a multipot including a first potentiometer winding means and a contact movable along the length thereof under the control of said scanning means and a second potentiometer winding means having a plurality of contacts associated therewith and independently movable along said second winding means for establishing predetermined correction voltages at various points along the length of said first winding means corresponding to different wavelengths;

detecting means disposed in said path and responsive to changes in the orientation of the plane of polarization of said polarized radiation in accordance with a property of a sample placed on said path;

means controlled by said detecting means for providing a voltage corresponding to the magnitude of said changes in the orientation of the plane of polarization of said polarized radiation at predetermined wavelengths; and means connected to said last-named means and responsive to said two voltages for compensating errors in the zero-level of said recorder;

whereby a spectrogram is produced which indicates the manner in which the rotation produced by said sample varies as a function of the wavelength of the radiation transmitted to said sample.

4. In a recording spectropolarimeter, a signal compensator for maintaining the constancy of the zero position of the recorder pen on a chart over a predetermined range of wavelengths of monochromatic light in said spectropolarimeter in the absence of a sample, said compensator comprising:

a servomotor drive means connected to said recorder pen;

a differential recording pen drive amplifier having an output connected to said servomotor drive means and having first and second inputs;

error signal means for producing a voltage dependent on a deviation of said recorder pen from a balance position;

compensation voltage means for supplying compensation voltages that correspond to the wavelength positions of said chart with respect to said recorder pen;

said error signal means and said compensation voltage means being connected between said first and second inputs of said differential amplifier to produce therein a first difference voltage;

zero baseline position-setting means for producing a voltage for shifting the zero position of said recorder pen, said base-line position-setting means also being connected between said first and second inputs of said differential amplifier; and said differential amplifier being responsive to said voltages to produce a zero compensation signal applied to said servomotor drive means to establish for said recorder pen a predetermined zero position relative to said chart over said predetermined range of wavelengths.

5. In a spectropolarimeter as defined in claim 4, the combination of:

means for projecting a plane-polarized beam to a sample and to means including a photodetector, where radiation is detected after being subjected to rotation in accordance with the properties of said sample;

monochromatizing means including dispersing means for establishing the wavelength of such detected monochromatic radiation;

scanning means coupled to said dispersing means for varying the wavelength of the detected monochromatic beam;

and means controlled by said scanning means for varying said compensation voltage as a function of wavelength to compensate for errors that would otherwise occur in the zero position of said recorder pen at various wavelengths in said predetermined wavelength range.

6. In a device for recording effects of specimens on polarized radiation at different wavelengths:

a recorder comprising a recording element for recording signals on a recording medium, means including a dispersing element for projecting polarized monochromatic radiation to a test specimen that changes the radiation in accordance with polarization-dependent properties of such a specimen and thence to a photodetector for producing an uncorrected signal voltage in accordance with such changes, said photodetector producing, in the presence of a reference specimen a reference level error voltage that varies as a function of the wavelength of the radiation, scanning means coupled to said dispersing element for varying the wavelength of the monochromatic radiation and means for advancing said recording medium relative to said recording element as the wavelength of the radiation is varied, correction means controlled by said scanning means for developing a correction voltage that varies as a function of the wavelength of the detected radiation, said correction means ccomprising a multipot including a first potentiometer winding means and a contact movable along the length thereof under the control of said scanning means and a second potentiometer winding means having a plurality of contacts associated therewith and independently movable along said second winding means for establishing correction voltages at various points along the length of said first winding means corresponding to different predetermined wavelengths, and subtractor means controlled by said uncorrected signal voltage and by said correction voltage for actuating said recording element whereby a corrected signal that varies as a function of such polarization dependent changes in the radiation, independently of variations in such reference-level error voltage, is recorded.

References Cited
UNITED STATES PATENTS

| | | | |
|---|---|---|---|
| 2,517,121 | 8/1950 | Liston | 250—43 |
| 2,768,306 | 10/1956 | Grubb et al. | 88—14X |
| 2,769,919 | 11/1956 | Crawford | 250—43.5 |
| 3,164,662 | 1/1965 | Grosjean et al. | 88—14 |
| 3,257,847 | 6/1966 | Levy et al. | 73—23.1 |
| 3,281,685 | 10/1966 | Talbot | 324—99 |

OTHER REFERENCES

Rassweiler et al.: "Recording and Control System for Infra-Red Spectrophotometer," J.O.S.A., vol. 37, No. 12, December 1947, pp. 963–974.

RONALD L. WIBERT, Primary Examiner

F. L. EVANS, Assistant Examiner

U.S. Cl. X.R.

356—116, 117; 324—100; 346—32, 33